United States Patent
Kim et al.

(10) Patent No.: US 8,351,535 B2
(45) Date of Patent: Jan. 8, 2013

(54) METHOD OF FEEDBACK INFORMATION TRANSMISSION, METHOD AND APPARATUS OF DATA TRANSMISSION IN A WIRELESS COMMUNICATION SYSTEM HAVING MULTIPLE ANTENNAS

(75) Inventors: Jae Wan Kim, Seoul (KR); Wook Bong Lee, Sungnam-si (KR); Su Nam Kim, Seoul (KR); Dong Guk Lim, Inchen (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 13/059,150

(22) PCT Filed: Aug. 13, 2009

(86) PCT No.: PCT/KR2009/004523
§ 371 (c)(1),
(2), (4) Date: Feb. 15, 2011

(87) PCT Pub. No.: WO2010/024543
PCT Pub. Date: Mar. 4, 2010

(65) Prior Publication Data
US 2011/0142166 A1 Jun. 16, 2011

Related U.S. Application Data

(60) Provisional application No. 61/091,728, filed on Aug. 25, 2008, provisional application No. 61/091,737, filed on Aug. 26, 2008.

(30) Foreign Application Priority Data

Apr. 16, 2009 (KR) .................. 10-2009-0033135

(51) Int. Cl.
H04B 7/02 (2006.01)
(52) U.S. Cl. ..... 375/267; 375/259; 375/260; 455/67.14; 370/330
(58) Field of Classification Search .................. None
See application file for complete search history.

(56) References Cited

U.S. PATENT DOCUMENTS

| | | | |
|---|---|---|---|
| 2007/0274411 A1 | 11/2007 | Lee et al. | |
| 2008/0260059 A1* | 10/2008 | Pan ................ | 375/260 |
| 2008/0298482 A1* | 12/2008 | Rensburg et al. ........... | 375/260 |
| 2010/0034308 A1* | 2/2010 | Kim et al. .................. | 375/267 |

FOREIGN PATENT DOCUMENTS

| | | |
|---|---|---|
| KR | 2008-0022033 | 3/2008 |
| KR | 2008-0036499 | 4/2008 |

* cited by examiner

*Primary Examiner* — David C. Payne
*Assistant Examiner* — Adolf Dsouza
(74) *Attorney, Agent, or Firm* — Morgan, Lewis & Bockius LLP

(57) ABSTRACT

A method of data transmission from a transmitter of a wireless communication system which uses multiple antennas comprises receiving identification information of a precoding matrix from a receiver, the precoding matrix being selected from a codebook generated using a plurality of first matrices generated by multiplying a discrete fourier transform (DFT) matrix by each of a plurality of phase shift matrices; precoding data to be transmitted, by using a precoding matrix indicated by the identification information; and transmitting the precoded data to the receiver by using the multiple antennas.

13 Claims, 5 Drawing Sheets

Fig. 3

$$W_0 = P(\phi_0)W_0 = \frac{1}{2}\left\{\begin{pmatrix}1\\1\\1\\1\end{pmatrix},\begin{pmatrix}1\\i\\-1\\-i\end{pmatrix},\begin{pmatrix}1\\-1\\1\\-1\end{pmatrix},\begin{pmatrix}1\\-i\\-1\\i\end{pmatrix}\right\}$$

$$W_1 = P(\phi_1)W_0 = \frac{1}{2}\left\{\begin{pmatrix}1\\0.9239+0.3827i\\0.7071+0.7071i\\0.3827+0.9239i\end{pmatrix},\begin{pmatrix}1\\-0.3827+0.9239i\\-0.7071-0.7071i\\0.9239-0.3827i\end{pmatrix},\begin{pmatrix}1\\-0.9239-0.3827i\\0.7071+0.7071i\\-0.3827-0.9239i\end{pmatrix},\begin{pmatrix}1\\0.3827-0.9239i\\-0.7071-0.7071i\\-0.9239+0.3827i\end{pmatrix}\right\}$$

$$W_2 = P(\phi_2)W_0 = \frac{1}{2}\left\{\begin{pmatrix}1\\0.7071+0.7071i\\i\\-0.7071+0.7071i\end{pmatrix},\begin{pmatrix}1\\-0.7071+0.7071i\\-i\\0.7071+0.7071i\end{pmatrix},\begin{pmatrix}1\\-0.7071-0.7071i\\i\\0.7071-0.7071i\end{pmatrix},\begin{pmatrix}1\\0.7071-0.7071i\\-i\\-0.7071-0.7071i\end{pmatrix}\right\}$$

$$W_3 = P(\phi_3)W_0 = \frac{1}{2}\left\{\begin{pmatrix}1\\0.3827+0.9239i\\-0.7071+0.7071i\\-0.9239-0.3827i\end{pmatrix},\begin{pmatrix}1\\-0.9239+0.3827i\\0.7071-0.7071i\\-0.3827+0.9239i\end{pmatrix},\begin{pmatrix}1\\0.3827\ 0.9239i\\-0.7071+0.7071i\\0.9239+0.3827i\end{pmatrix},\begin{pmatrix}1\\0.9239-0.3827i\\0.7071-0.7071i\\0.3827-0.9239i\end{pmatrix}\right\}$$

Fig. 4

$$W_0 = P(\phi_0)W_0 = \frac{1}{2}\left\{\begin{pmatrix}1\\1\\1\\1\end{pmatrix}, \begin{pmatrix}1\\i\\-1\\-i\end{pmatrix}, \begin{pmatrix}1\\-1\\1\\-1\end{pmatrix}, \begin{pmatrix}1\\-i\\-1\\i\end{pmatrix}\right\}$$

$$W_1 = P(\phi_1)W_0 = \frac{1}{2}\left\{\begin{pmatrix}1\\0.9808+0.1951i\\0.9239+0.3827i\\0.8315+0.5556i\end{pmatrix}, \begin{pmatrix}1\\-0.1951+0.9808i\\-0.9239-0.3827i\\0.5556-0.8315i\end{pmatrix}, \begin{pmatrix}1\\-0.9808-0.1951i\\0.9239+0.3827i\\-0.8315-0.5556i\end{pmatrix}, \begin{pmatrix}1\\0.1951-0.9808i\\-0.9239-0.3827i\\-0.5556+0.8315i\end{pmatrix}\right\}$$

$$W_2 = P(\phi_2)W_0 = \frac{1}{2}\left\{\begin{pmatrix}1\\0.9239+0.3827i\\0.7071+0.7071i\\0.3827+0.9239i\end{pmatrix}, \begin{pmatrix}1\\-0.3827+0.9239i\\-0.7071-0.7071i\\0.9239-0.3827i\end{pmatrix}, \begin{pmatrix}1\\-0.9239-0.3827i\\0.7071+0.7071i\\-0.3827-0.9239i\end{pmatrix}, \begin{pmatrix}1\\0.3827-0.9239i\\-0.7071-0.7071i\\-0.9239+0.3827i\end{pmatrix}\right\}$$

$$W_3 = P(\phi_3)W_0 = \frac{1}{2}\left\{\begin{pmatrix}1\\0.8315+0.5556i\\0.3827+0.9239i\\-0.1951+0.9808i\end{pmatrix}, \begin{pmatrix}1\\-0.5556+0.8315i\\-0.3827-0.9239i\\0.9808+0.1951i\end{pmatrix}, \begin{pmatrix}1\\-0.8315-0.5556i\\0.3827+0.9239i\\0.1951-0.9808i\end{pmatrix}, \begin{pmatrix}1\\0.5556-0.8315i\\-0.3827-0.9239i\\-0.9808-0.1951i\end{pmatrix}\right\}$$

$$W_4 = P(\phi_4)W_0 = \frac{1}{2}\left\{\begin{pmatrix}1\\0.7071+0.7071i\\i\\-0.7071+0.7071i\end{pmatrix}, \begin{pmatrix}1\\-0.7071+0.7071i\\-i\\0.7071+0.7071i\end{pmatrix}, \begin{pmatrix}1\\-0.7071-0.7071i\\i\\0.7071-0.7071i\end{pmatrix}, \begin{pmatrix}1\\0.7071-0.7071i\\-i\\-0.7071-0.7071i\end{pmatrix}\right\}$$

$$W_5 = P(\phi_5)W_0 = \frac{1}{2}\left\{\begin{pmatrix}1\\0.5556+0.8315i\\-0.3827+0.9239i\\-0.9808+0.1951i\end{pmatrix}, \begin{pmatrix}1\\-0.8315+0.5556i\\0.3827-0.9239i\\0.1951+0.9808i\end{pmatrix}, \begin{pmatrix}1\\-0.5556-0.8315i\\-0.3827+0.9239i\\0.9808-0.1951i\end{pmatrix}, \begin{pmatrix}1\\0.8315-0.5556i\\0.3827-0.9239i\\-0.1951-0.9808i\end{pmatrix}\right\}$$

$$W_6 = P(\phi_6)W_0 = \frac{1}{2}\left\{\begin{pmatrix}1\\0.3827+0.9239i\\-0.7071+0.7071i\\-0.9239-0.3827i\end{pmatrix}, \begin{pmatrix}1\\-0.9239+0.3827i\\0.7071-0.7071i\\-0.3827+0.9239i\end{pmatrix}, \begin{pmatrix}1\\-0.3827-0.9239i\\-0.7071+0.7071i\\0.9239+0.3827i\end{pmatrix}, \begin{pmatrix}1\\0.9239-0.3827i\\0.7071-0.7071i\\0.3827-0.9239i\end{pmatrix}\right\}$$

$$W_7 = P(\phi_7)W_0 = \frac{1}{2}\left\{\begin{pmatrix}1\\0.1951+0.9808i\\-0.9239+0.3827i\\-0.5556-0.8315i\end{pmatrix}, \begin{pmatrix}1\\-0.9808+0.1951i\\0.9239-0.3827i\\-0.8315+0.5556i\end{pmatrix}, \begin{pmatrix}1\\-0.1951-0.9808i\\-0.9239+0.3827i\\0.5556+0.8315i\end{pmatrix}, \begin{pmatrix}1\\0.9808-0.1951i\\0.9239-0.3827i\\0.8315-0.5556i\end{pmatrix}\right\}$$

Fig. 5

$$W_0 = P(\phi_0)W_{2by2} = \frac{1}{\sqrt{2}}\begin{bmatrix} 1 & 1 \\ 1 & -1 \end{bmatrix}$$

$$W_1 = P(\phi_1)W_{2by2} = \frac{1}{\sqrt{2}}\begin{bmatrix} 1 & 1 \\ 0.7071+i0.7071 & -0.7071-i0.7071 \end{bmatrix}$$

$$W_2 = P(\phi_2)W_{2by2} = \frac{1}{\sqrt{2}}\begin{bmatrix} 1 & 1 \\ i & -i \end{bmatrix}$$

$$W_3 = P(\phi_3)W_{2by2} = \frac{1}{\sqrt{2}}\begin{bmatrix} 1 & 1 \\ -0.7071+0.7071i & 0.7071-0.7071i \end{bmatrix}$$

METHOD OF FEEDBACK INFORMATION TRANSMISSION, METHOD AND APPARATUS OF DATA TRANSMISSION IN A WIRELESS COMMUNICATION SYSTEM HAVING MULTIPLE ANTENNAS

The present application is a national stage of PCT International Application No. PCT/KR2009/004523, filed Aug. 13, 2009, and claims the benefit of U.S. Provisional Application Nos. 61/091,728 and 61/091,737, respectively filed Aug. 25, 2008, and Aug. 26, 2008. The present national stage application also claims the benefit of Korean Patent Application No. 10-2009-0033135, filed Apr. 16, 2009.

TECHNICAL FIELD

The present invention relates to a wireless communication system, and more particularly to, a method of feedback information transmission and a method and apparatus of data transmission in a wireless communication system having multiple antennas.

BACKGROUND ART

Multi-Input Multi-Output (MIMO) technology is to improve efficiency in data transmission and reception by using multiple transmitting antennas and multiple receiving antennas instead of a single transmitting antenna and a single receiving antenna.

If a single antenna is used, a receiver receives data through a single antenna path. However, if multiple antennas are used, the receiver receives data through various paths. Accordingly, data transmission speed and data transmission rate can be improved, and coverage can be increased.

In a wireless communication system which uses multiple antennas, there are provided an open-loop multi-antenna system and a closed-loop multi-antenna system, wherein the open-loop multi-antenna system does not use feedback information from a receiver but the closed-loop multi-antenna system uses feedback information from a receiver. According to the closed-loop multi-antenna system, a receiver transmits feedback information of channel status to a transmitter and the transmitter identifies the channel status through the feedback information, whereby throughput of a wireless communication system is improved.

The closed-loop multi-antenna system uses a precoding scheme. According to the precoding scheme, a transmitter processes transmission data using feedback information of channel status, which is transmitted from a receiver, whereby the data is affected by a channel within the minimum range.

Examples of the precoding scheme include a codebook based precoding scheme for improving a signal to noise ratio (SNR) and a quantization precoding scheme for quantizing channel information and feeding the quantized channel information back.

According to the codebook based precoding scheme, if the receiver selects a precoding matrix from a codebook previously shared between the transmitter and the receiver and feeds an index of the selected precoding matrix back to the transmitter, the transmitter modifies transmission data using the precoding matrix which is fed back. Namely, since feeding all kinds of channel information back causes high system overhead, channel information for feedback is quantized to constitute a codebook and an index is allocated to each of precoding matrixes included in the codebook so that the receiver feeds only the index back to the transmitter, whereby system overhead is reduced.

Examples of the codebook based precoding scheme according to the related art include a per user unitary rate control (PU2RC) and SIC-based per user and stream rate control (S-PUSRC).

First of all, the PU2RC will be described. Fourier basis is used as a unitary matrix for precoding, wherein the unitary matrix is extended in accordance with the number of transmitting antennas and then used as a precoding matrix. A column vector $e_m^{(g)}$ constituting a unitary matrix used in the PU2RC is expressed by Equation 1.

$$e_m^{(g)} = \frac{1}{\sqrt{M}}\left[w_{0m}^{(g)} \ldots w_{(M-1)m}^{(g)}\right]^T, \quad \text{[Equation 1]}$$

$$w_{nm}^{(g)} = \exp\left\{j\frac{2\pi n}{M}\left(m + \frac{g}{G}\right)\right\}$$

In the Equation 1, M represents the number of transmitting antennas, and G represents the number of precoding matrix groups. Also, n represents an index of a transmitting antenna, g represents an index of a precoding matrix group, and m represents an index of a virtual beam forming pattern, i.e., a column vector.

In case of the S-PUSRC, a switching beam forming vector is used as a precoding matrix as expressed by Equation 2 below.

$$P=[a_1 a_2 a_{2N}]$$

$$a_i=[1 e^{j\phi_i} \ldots e^{j(N-1)\phi_i}]^T, \phi_i=kd\sin(\theta_i) \quad \text{[Equation 2]}$$

In the Equation 2, N represents the number of transmitting antenna devices, $a_i$ represents a precoding vector, k represents a wavelength, $-_i$ represents a steering direction, and d represents the distance between neighboring transmitting antenna devices.

In a closed-loop single user MIMO system, its throughput depends on accuracy of feedback, which is varied depending on data of a precoding matrix fed back from the receiver. If the number of transmitting antennas increases, a size of a codebook increases, whereby data to be fed back increases. Receiving throughput depends on a design of a codebook. Accordingly, it is important to design a codebook so that data to be fed back from the receiver is small and system throughput is excellent. It is also important to design a codebook so that complexity of a receiver is low.

DISCLOSURE OF INVENTION

Technical Problem

A codebook according to the related art has problems in that its throughput is deteriorated when channel correlation is high and different throughputs occur depending on antenna structure and interval. A method for generating a codebook in accordance with the related art has problems in that it is difficult to extend a codebook size and design a structural codebook having adaptability according to channel status, i.e., rank.

An object of the present invention is to provide a method for generating a codebook having excellent throughput even when channel correlation is high.

Another object of the present invention is to provide a method for generating a structural codebook, in which a codebook size can be extended easily and the codebook has adaptability according to rank.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

In order to solve the above technical problems, a method of data transmission from a transmitter of a wireless communication system which uses multiple antennas comprises receiving identification information of a precoding matrix from a receiver, the precoding matrix being selected from a codebook generated using a plurality of first matrixes generated by multiplying a discrete fourier transform (DFT) matrix by each of a plurality of phase shift matrixes; precoding data to be transmitted, by using a precoding matrix indicated by the identification information; and transmitting the precoded data to the receiver by using the multiple antennas.

In another aspect of the present invention, an apparatus of data transmission in a wireless communication system which uses multiple antennas comprises a precoding module precoding data to be transmitted, by using a precoding matrix selected by a receiver from a codebook generated using a plurality of first matrixes generated by multiplying a discrete fourier transform (DFT) matrix by each of a plurality of phase shift matrixes; and multiple antennas transmitting the precoded data to the receiver.

In this case, each of the plurality of phase shift matrixes is a diagonal matrix, and when N is the number of the plurality of phase shift matrixes and i is an integer more than 0 and less than N, (k,k) element of the ith phase shift matrix of the plurality of phase shift matrixes is $$e^{j(k-1)\phi_i}, \phi_i = \frac{\pi * i}{2N}.$$

Also, the codebook is obtained by giving index to each of precoding matrixes for each rank, the precoding matrixes being generated by selecting column vectors equivalent to the number of ranks from column vectors included in the plurality of first matrixes and combining the selected vectors.

In other aspect of the present invention, a method of feedback information transmission from a receiver of a wireless communication system which uses multiple antennas comprises estimating a channel between a transmitter and the receiver using a pilot signal received from the transmitter; selecting an optimized precoding matrix from a codebook generated using each of plurality of matrixes generated by multiplying a discrete fourier transform (DFT) matrix by each of a plurality of phase shift matrixes by considering the estimated channel; and feeding identification information of the selected precoding matrix back to the transmitter.

Advantageous Effects

According to the embodiments of the present invention, the following advantages can be obtained.

First of all, since a codebook is generated based on a DFT matrix, its throughput is excellent even when channel status is high.

Second, since the codebook is extended using a phase shift matrix, its size can be extended easily.

Third, since a codebook is generated per rank using a matrix obtained by phase shifting a DFT matrix, a structural codebook having adaptability according to rank can be obtained.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

FIG. 3 is a diagram illustrating a plurality of precoding matrixes generated to constitute a 4-bit codebook in accordance with the embodiment of the present invention;

FIG. 4 is a diagram illustrating a plurality of precoding matrixes generated to constitute a 5-bit codebook in accordance with the embodiment of the present invention; and FIG. 5 is a diagram illustrating a plurality of precoding matrixes generated to constitute a 3-bit codebook in accordance with the embodiment of the present invention.

BEST MODE FOR CARRYING OUT THE INVENTION

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In the description, when some part "includes" some elements, it means that the part can further include other elements unless mentioned to the contrary. Also, terminologies " . . . part," " . . . block," and " . . . module" described herein mean a unit processing at least one function or operation, and can be implemented by hardware, software or combination of hardware and software.

First of all, a configuration of a transmitter of a wireless communication system having multiple antennas will be described with reference to FIG. 1.

Figure 1:
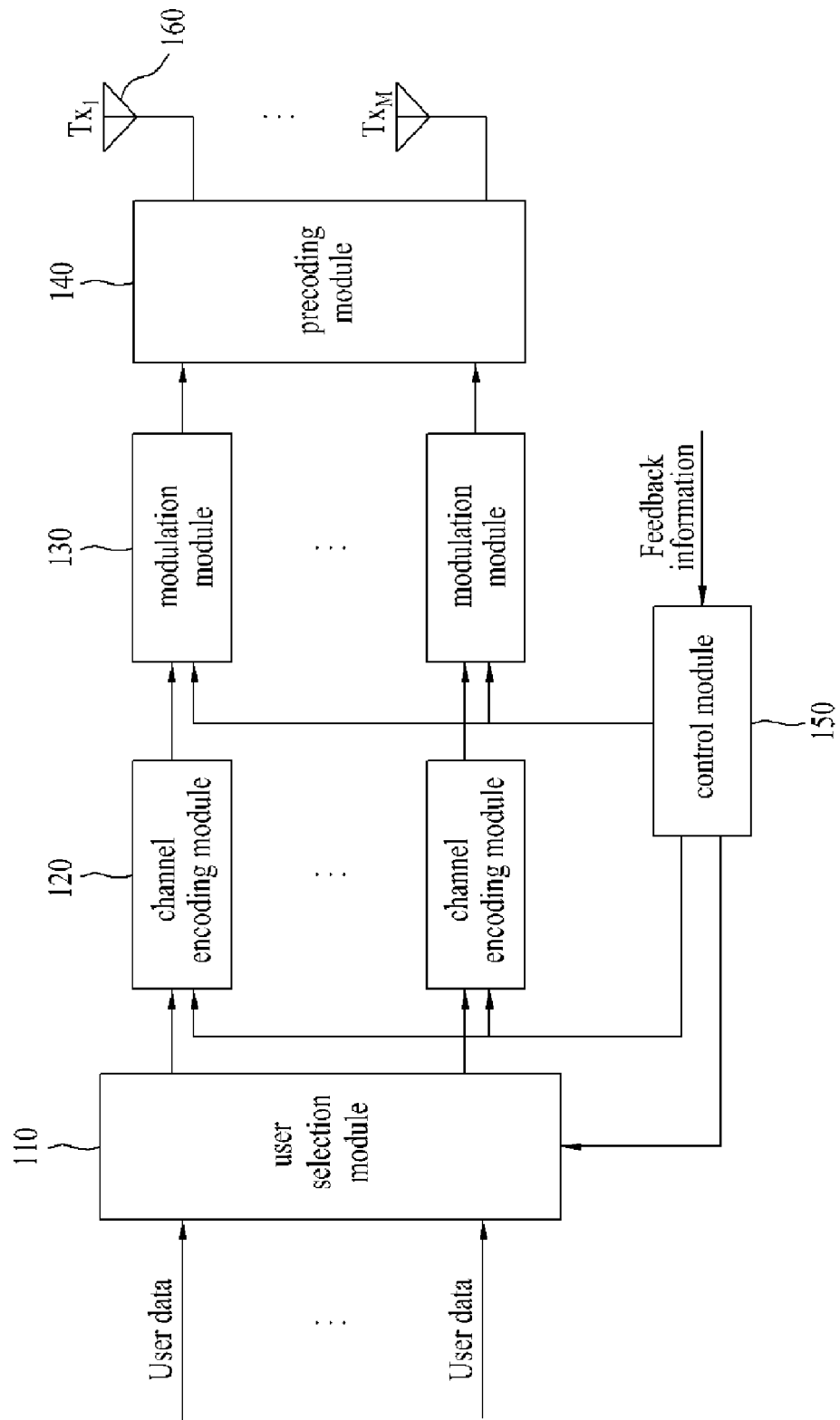
FIG. 1 is a schematic view illustrating a transmitter of a wireless communication system having multiple antennas.
Figure 2:
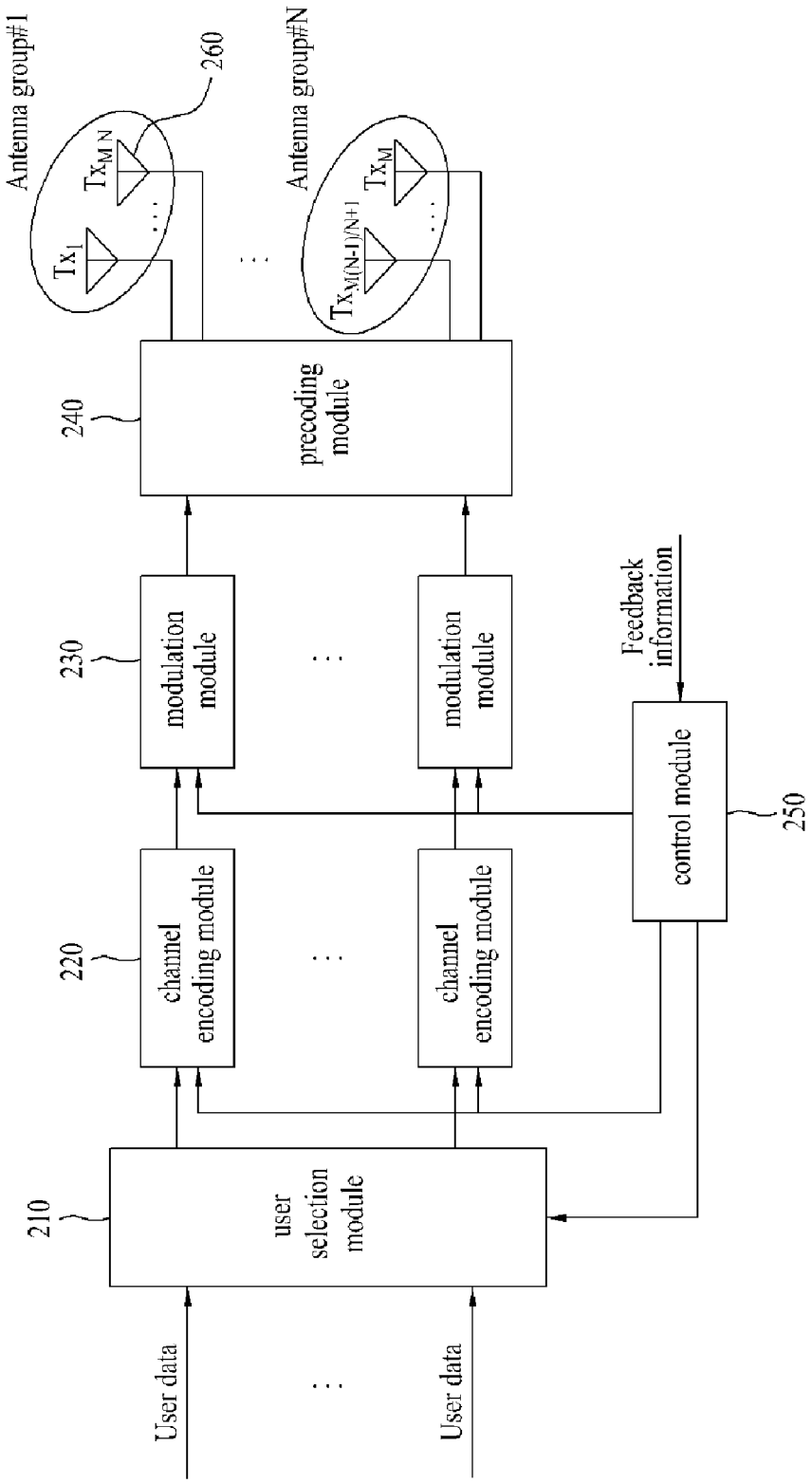
FIG. 2 is a schematic view illustrating a transmitter when antennas are grouped in a wireless communication system having multiple antennas.

FIG. 1 is a schematic view illustrating a transmitter of a wireless communication system having multiple antennas, and FIG. 2 is a schematic view illustrating a transmitter when antennas are grouped in a wireless communication system having multiple antennas. As illustrated in FIG. 1 and FIG. 2, a transmitter of a wireless communication system having multiple antennas includes user selection modules 110 and 220, channel encoding modules 120 and 220, modulation modules 130 and 230, precoding modules 140 and 240, control modules 150 and 250, and multiple antennas 160 and 260.

If user data are input to the user selection modules 110 and 210, the user selection modules 110 and 210 select a user and input data of the selected user to the channel encoding modules 120 and 220 in the form of a single data stream or multiple data streams.

The channel encoding modules 120 and 220 channel-encodes data to be transmitted, and the modulation modules 130 and 230 modulate the data by performing constellation mapping. The precoding modules 140 and 240 multiply the data by a precoding vector, wherein the precoded data are transmitted through the multiple antennas 160 and 260. At this time, the precoded data can be transmitted through various multiple antenna transmitting schemes.

The control blocks 150 and 250 controls user selection of the user selection modules 110 and 210 and precoding vector selection of the precoding modules 140 and 240 by using feedback information received from a receiver.

In a wireless communication system having multiple antennas, a transmitter and a receiver know a codebook which is previously generated. The codebook previously known by the transmitter and the receiver could be a codebook generated in accordance with the embodiment of the present invention. A method for generating a codebook in accordance with the embodiment of the present invention will be described later.

If the transmitter transmits a pilot signal to the receiver, the receiver estimates a channel between the transmitter and the receiver using the pilot signal to select a precoding matrix most suitable for the current channel status from the codebook previously known by the transmitter and the receiver. Then, the receiver feeds identification information of the selected precoding matrix back to the transmitter. The identification information of the precoding matrix is to identify the precoding matrix. An example of the identification information includes an index of the precoding matrix. Then, the precoding module 140 of the transmitter multiplies the data by the precoding matrix corresponding to the index received from the receiver.

As illustrated in FIG. 1, the multiple antennas 160 may respectively perform their function. As illustrated in FIG. 2, the multiple antennas 260 may be grouped in N antenna groups to perform beam forming and multiple antenna function per group. In FIG. 2, in a plurality of antennas included in one antenna group, the distance between antenna devices could be -/2, and the distance between the antenna groups could be 4-. If the antenna is grouped in N antenna groups, the N antennas are used to perform a multiple antenna function.

The multiple antennas could be linear array antennas or dual polarized antennas. The transmitter can notify antenna configuration information using 1 bit, wherein the antenna configuration information represents whether the multiple antennas are linear array antennas or dual polarized antennas. The embodiment of the present invention suggests a method for generating a codebook when linear array antennas are used and a method for generating a codebook when dual polarized antennas are used.

Hereinafter, a method for generating a codebook in accordance with the embodiment of the present invention will be described. The codebook generated in accordance with the embodiment of the present invention is previously known by the transmitter and the receiver. If the receiver selects the most suitable precoding matrix from the codebook and transmits identification information of the selected precoding matrix to the transmitter, the transmitter performs precoding for data to be transmitted, by using the precoding matrix indicated by the identification information of the precoding matrix.

According to the method for generating a codebook in accordance with the embodiment of the present invention, a phase shift matrix is multiplied by a DFT codebook to extend the DFT codebook.

First of all, a case where maximum rank is 4 will be described. If the number of transmitting antennas and the number of receiving antennas are respectively 4, maximum rank is 4. If the rank is 4, the DFT codebook is as expressed by Equation 1. The rank represents the number of data streams that can be transmitted once through the multiple antennas.

$$W_0 = \{b_0, b_1, b_2, b_3\} \quad \text{[Equation 1]}$$

$$= \frac{1}{2}\left\{\begin{pmatrix} 1 \\ 1 \\ 1 \\ 1 \end{pmatrix}, \begin{pmatrix} 1 \\ j \\ -1 \\ -j \end{pmatrix}, \begin{pmatrix} 1 \\ -1 \\ 1 \\ -1 \end{pmatrix}, \begin{pmatrix} 1 \\ -j \\ -1 \\ j \end{pmatrix}\right\}$$

The phase shift matrix of the Equation 2 is multiplied by the DFT codebook to generate N precoding matrixes. In this case, n represents the number of bits intended to extend the DFT codebook. $-_i$ may be distributed equally as expressed by the Equation 2 but may be distributed unequally for a specific purpose. It is noted from the Equation 2 that $-_i$ is obtained by equally dividing -/2 by -i/2N. Namely, the phase of the precoding vector is equally arranged within the range of -/2.

$$P(\phi_i) = \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix}, \quad \text{[Equation 2]}$$

$$\phi_i = \frac{\pi * i}{2N}, \, i = 0, 1, \ldots N-1, N = 2^n$$

In the embodiment of the present invention, a method for generating a 4-bit codebook by extending $W_0$ as much as 2 bits and a method for generating a 5-bit codebook by extending $W_0$ as much as 3 bits will be described, for example.

If n is 2, $-_i=0$, -/8, -/4, 3-/8 is obtained. If $W_0$ is multiplied by $P(-_i)$, a plurality of precoding matrixes are generated as illustrated in FIG. 3. FIG. 3 is a diagram illustrating a plurality of precoding matrixes generated to constitute a 4-bit codebook in accordance with the embodiment of the present invention.

A 4-bit codebook illustrated in Table 1 is generated using the precoding matrixes of FIG. 3. Namely, column vectors are combined from each of the precoding matrixes of FIG. 3 to generate a codebook for each rank. In Table 1, indexes are defined regardless of the order of precoding matrixes of each rank. In Table 1, $W_i[:, k]$ means the kth column vector, $W_i[:, kl]$ means a matrix of the kth column vector and the lth column vector of $W_i$, $W_i[:, klm]$ means a matrix of the kth column vector, the lth column vector, and the mth column vector of $W_i$, and $W_i[:, klmp]$ means a matrix of the kth column vector, the lth column vector, the mth column vector, and the pth column vector of $W_i$.

TABLE 1

| Index | Rank 1 | Rank 2 | Rank 3 | Rank 4 |
|---|---|---|---|---|
| 0 | $W_0[:, 1]$ | $W_0[:, 12]$ | $W_0[:, 123]$ | $W_0[:, 1234]$ |
| 1 | $W_0[:, 2]$ | $W_0[:, 13]$ | $W_0[:, 124]$ | $W_1[:, 1234]$ |
| 2 | $W_0[:, 3]$ | $W_0[:, 14]$ | $W_0[:, 134]$ | $W_2[:, 1234]$ |
| 3 | $W_0[:, 4]$ | $W_0[:, 23]$ | $W_0[:, 234]$ | $W_3[:, 1234]$ |
| 4 | $W_1[:, 1]$ | $W_0[:, 24]$ | $W_1[:, 123]$ | N/A |
| 5 | $W_1[:, 2]$ | $W_0[:, 34]$ | $W_1[:, 124]$ | N/A |
| 6 | $W_1[:, 3]$ | $W_2[:, 12]$ | $W_1[:, 134]$ | N/A |
| 7 | $W_1[:, 4]$ | $W_2[:, 13]$ | $W_1[:, 234]$ | N/A |
| 8 | $W_2[:, 1]$ | $W_2[:, 14]$ | $W_2[:, 123]$ | N/A |
| 9 | $W_2[:, 2]$ | $W_2[:, 23]$ | $W_2[:, 124]$ | N/A |
| 10 | $W_2[:, 3]$ | $W_2[:, 24]$ | $W_2[:, 134]$ | N/A |
| 11 | $W_2[:, 4]$ | $W_2[:, 34]$ | $W_2[:, 234]$ | N/A |
| 12 | $W_3[:, 1]$ | $W_1[:, 12]$ | $W_3[:, 123]$ | N/A |
| 13 | $W_3[:, 2]$ | $W_1[:, 13]$ | $W_3[:, 124]$ | N/A |

TABLE 1-continued

| Index | Rank 1 | Rank 2 | Rank 3 | Rank 4 |
|---|---|---|---|---|
| 14 | $W_3[:, 3]$ | $W_1[:, 14]$ | $W_3[:, 134]$ | N/A |
| 15 | $W_3[:, 4]$ | $W_1[:, 23]$ | $W_3[:, 234]$ | N/A |

In Table 1, since a precoding matrix needs a single column vector when rank is 1, the number of cases for selecting a single column vector from each of the precoding matrixes of FIG. 3 is 4. Also, since there are provided four precoding matrixes in FIG. 3, a total of sixteen precoding matrixes of rank 1 can be generated.

In Rank 2, available combination of column vectors is more than index. If two column vectors are selected from four column vectors and then combined, precoding matrixes of rank 2 are generated. In this case, since the number of cases for selecting two from four is 6, six precoding matrixes of rank 2 can be generated for each of the precoding matrixes of FIG. 3, whereby a total of twenty-four precoding matrixes of rank 2 can be generated. Since index is 16, sixteen (16) precoding matrixes should be selected from twenty-four precoding matrixes.-$_2$ that can divide phase equally is selected prior to -$_1$. Since -$_2$ is -/4, -/2 is divided into half to divide a phase of a precoding matrix more equally than -$_1$=-/8. Namely, the even numbered -$_i$ can divide a phase of a precoding matrix equally.

In the precoding matrix of rank 3, since three column vectors should be combined, the number of cases for selecting three column vectors from each of precoding matrixes of FIG. 3 is 4, and there are provided four precoding matrixes in FIG. 3, whereby a total of sixteen precoding matrixes of rank 3 can be generated.

In the precoding matrix of rank 4, since four column vectors should be combined, the number of cases for selecting four column vectors from each of precoding matrixes of FIG. 3 is 1, and there are provided four precoding matrixes in FIG. 3, whereby a total of four precoding matrixes of rank 4 can be generated.

If n is 3, -$_i$=0, -/16, -/8, 3-/16, -/4, 5-/16, 3-/8, 7-/16 is obtained. If $W_0$ is multiplied by $P(-_i)$, a plurality of precoding matrixes are generated as illustrated in FIG. 4. FIG. 4 is a diagram illustrating a plurality of precoding matrixes generated to constitute a 5-bit codebook in accordance with the embodiment of the present invention.

A 5-bit codebook illustrated in Table 2 is generated using the precoding matrixes of FIG. 4. In Table 2, indexes are defined regardless of the order of precoding matrixes of each rank. Namely, indexes can randomly be given to the precoding matrixes.

TABLE 2

| Index | Rank 1 | Rank 2 | Rank 3 | Rank 4 |
|---|---|---|---|---|
| 0 | $W_0[:, 1]$ | $W_0[:, 12]$ | $W_0[:, 123]$ | $W_0[:, 1234]$ |
| 1 | $W_0[:, 2]$ | $W_0[:, 13]$ | $W_0[:, 124]$ | $W_1[:, 1234]$ |
| 2 | $W_0[:, 3]$ | $W_0[:, 14]$ | $W_0[:, 134]$ | $W_2[:, 1234]$ |
| 3 | $W_0[:, 4]$ | $W_0[:, 23]$ | $W_0[:, 234]$ | $W_3[:, 1234]$ |
| 4 | $W_1[:, 1]$ | $W_0[:, 24]$ | $W_1[:, 123]$ | $W_4[:, 1234]$ |
| 5 | $W_1[:, 2]$ | $W_0[:, 34]$ | $W_1[:, 124]$ | $W_5[:, 1234]$ |
| 6 | $W_1[:, 3]$ | $W_2[:, 12]$ | $W_1[:, 134]$ | $W_6[:, 1234]$ |
| 7 | $W_1[:, 4]$ | $W_2[:, 13]$ | $W_1[:, 234]$ | $W_7[:, 1234]$ |
| 8 | $W_2[:, 1]$ | $W_2[:, 14]$ | $W_2[:, 123]$ | N/A |
| 9 | $W_2[:, 2]$ | $W_2[:, 23]$ | $W_2[:, 124]$ | N/A |
| 10 | $W_2[:, 3]$ | $W_2[:, 24]$ | $W_2[:, 134]$ | N/A |
| 11 | $W_2[:, 4]$ | $W_2[:, 34]$ | $W_2[:, 234]$ | N/A |
| 12 | $W_3[:, 1]$ | $W_4[:, 12]$ | $W_3[:, 123]$ | N/A |
| 13 | $W_3[:, 2]$ | $W_4[:, 13]$ | $W_3[:, 124]$ | N/A |
| 14 | $W_3[:, 3]$ | $W_4[:, 14]$ | $W_3[:, 134]$ | N/A |
| 15 | $W_3[:, 4]$ | $W_4[:, 23]$ | $W_3[:, 234]$ | N/A |
| 16 | $W_4[:, 1]$ | $W_4[:, 24]$ | $W_4[:, 123]$ | N/A |
| 17 | $W_4[:, 2]$ | $W_4[:, 34]$ | $W_4[:, 124]$ | N/A |
| 18 | $W_4[:, 3]$ | $W_6[:, 12]$ | $W_4[:, 134]$ | N/A |
| 19 | $W_4[:, 4]$ | $W_6[:, 13]$ | $W_4[:, 234]$ | N/A |
| 20 | $W_5[:, 1]$ | $W_6[:, 14]$ | $W_5[:, 123]$ | N/A |
| 21 | $W_5[:, 2]$ | $W_6[:, 23]$ | $W_5[:, 124]$ | N/A |
| 22 | $W_5[:, 3]$ | $W_6[:, 24]$ | $W_5[:, 134]$ | N/A |
| 23 | $W_5[:, 4]$ | $W_6[:, 34]$ | $W_5[:, 234]$ | N/A |
| 24 | $W_6[:, 1]$ | $W_1[:, 12]$ | $W_6[:, 123]$ | N/A |
| 25 | $W_6[:, 2]$ | $W_1[:, 13]$ | $W_6[:, 124]$ | N/A |
| 26 | $W_6[:, 3]$ | $W_1[:, 14]$ | $W_6[:, 134]$ | N/A |
| 27 | $W_6[:, 4]$ | $W_1[:, 23]$ | $W_6[:, 234]$ | N/A |
| 28 | $W_7[:, 1]$ | $W_1[:, 24]$ | $W_7[:, 123]$ | N/A |
| 29 | $W_7[:, 2]$ | $W_1[:, 34]$ | $W_7[:, 124]$ | N/A |
| 30 | $W_7[:, 3]$ | $W_3[:, 12]$ | $W_7[:, 134]$ | N/A |
| 31 | $W_7[:, 4]$ | $W_3[:, 13]$ | $W_7[:, 234]$ | N/A |

In the same manner as that n is 2, even in the case that n is 3, available combination of column vectors in rank 2 is more than codebook index. Since six precoding matrixes of rank 2 can be generated for each of the precoding matrixes of FIG. 4, a total of forty-eight precoding matrixes of rank 2 can be generated. The 5-bit codebook has thirty-two indexes. Accordingly, thirty-two should be selected from the forty-eight column vector combinations, wherein -$_0$, -$_2$, -$_4$, -$_6$ that can divide phase equally are selected prior to -$_1$, -$_3$, -$_5$, -$_7$. As described above, the even numbered -$_i$ can divide a phase of a precoding matrix equally.

The 4-bit codebook and the 5-bit codebook generated as above are those for linear array antennas. Accordingly, in order that the 4-bit codebook and the 5-bit codebook are used as those for dual polarized antennas, the precoding matrixes of FIG. 3 and FIG. 4 are multiplied by a diagonal matrix of FIG. 3 with a fixed antenna weight.

$$D = \begin{pmatrix} 1 & 0 & 0 & 0 \\ 0 & 1 & 0 & 0 \\ 0 & 0 & 1 & 0 \\ 0 & 0 & 0 & -1 \end{pmatrix} \quad [\text{Equation 3}]$$

Then, the precoding matrixes of FIG. 3 and FIG. 4 become $DW_i$.

Now, a method for generating a 3-bit codebook when two antennas are provided in accordance with the embodiment of the present invention will be described with reference to FIG. 5.

When the number of transmitting antennas and the number of receiving antennas are respectively 2, maximum rank is 2. If rank is 2, a DFT codebook is expressed by Equation 4 below.

$$W_{2by2} = [b_0 \; b_1] = \frac{1}{\sqrt{2}} \begin{bmatrix} 1 & 1 \\ 1 & -1 \end{bmatrix} \quad [\text{Equation 4}]$$

In order to extend the DFT codebook as much as n bits, the DFT codebook is multiplied by a phase shift matrix of Equation 5.

$$P(\phi_i)_{2by2} = \frac{1}{\sqrt{2}}\begin{bmatrix} 1 & 0 \\ 0 & e^{j\phi_i} \end{bmatrix} \quad \text{[Equation 5]}$$

$$\phi_i = \frac{\pi * i}{N}, i = 0, 1, \ldots N-1, N = 2^n$$

If n is 2, $-_i$=0, -/4, -/2, 3-/4 is obtained. If $W_{2by2}$ is multiplied by $P(-_i)_{2by2}$, a plurality of precoding matrixes are generated as illustrated in FIG. 5. FIG. 5 is a diagram illustrating a plurality of precoding matrixes generated to constitute a 3-bit codebook in accordance with the embodiment of the present invention.

A 3-bit codebook illustrated in Table 3 is generated using the precoding matrixes of FIG. 5.

TABLE 3

| Index | Rank 1 | Rank 2 |
|---|---|---|
| 0 | $W_0[:,1]$ | $W_0[:,12]$ |
| 1 | $W_0[:,2]$ | $W_1[:,12]$ |
| 2 | $W_1[:,1]$ | $W_2[:,12]$ |
| 3 | $W_1[:,2]$ | $W_3[:,12]$ |
| 4 | $W_2[:,1]$ | N/A |
| 5 | $W_2[:,2]$ | N/A |
| 6 | $W_3[:,1]$ | N/A |
| 7 | $W_3[:,2]$ | N/A |

The embodiment according to the present invention can be implemented by various means, for example, hardware, firmware, software, or their combination. If the embodiment according to the present invention is implemented by hardware, the method for generating a codebook in accordance with the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method for generating a codebook in accordance with the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Moreover, it will be apparent that some claims referring to specific claims may be combined with another claims referring to the other claims other than the specific claims to constitute the embodiment or add new claims by means of amendment after the application is filed.

The invention claimed is:

1. A method of data transmission from a transmitter of a wireless communication system which uses multiple antennas, the method comprising:

receiving identification information of a precoding matrix from a receiver, the precoding matrix being selected from a codebook generated using a plurality of first matrices generated by multiplying a discrete fourier transform (DFT) matrix by each of a plurality of phase shift matrices;

precoding data to be transmitted, by using a precoding matrix indicated by the identification information; and transmitting the precoded data to the receiver by using the multiple antennas, wherein each of the plurality of phase shift matrices is a diagonal matrix, and when N is the number of the plurality of phase shift matrices and i is an integer greater than or equal to 0 and less than N, (k,k) element of the ith phase shift matrix of the plurality of phase shift matrices is $$e^{j(k-1)\phi_i}, \phi_i = \frac{\pi * i}{2N}.$$

2. The method of claim 1, wherein the codebook is obtained by giving an index to each of precoding matrices for each rank, the precoding matrices being generated by selecting column vectors equivalent to the number of ranks from column vectors included in the plurality of first matrices and combining the selected vectors.

3. The method of claim 2, wherein the codebook is obtained by first giving the index to the precoding matrices generated by combining column vectors of first matrices generated by even numbered phase shift matrices of the plurality of phase shift matrices if the number of precoding matrices for each rank is more than the number of the indexes.

4. The method of claim 1, wherein, if the multiple antennas are dual polarized antennas, the codebook is generated based on a plurality of second matrices generated by multiplying the plurality of first matrices by a fixed antenna weight.

5. The method of claim 4, wherein the fixed antenna weight is an M*M diagonal matrix, (M,M) element is −1, and elements on a diagonal line other than the (M,M) element are all 1.

6. The method of claim 4, wherein the codebook is generated using each column vector of the plurality of second matrices.

7. The method of claim 4, further comprising notifying the receiver of antenna configuration information through indication information.

8. An apparatus of data transmission in a wireless communication system which uses multiple antennas, the apparatus comprising:

a precoding module precoding data to be transmitted, by using a precoding matrix selected by a receiver from a codebook generated using a plurality of first matrices generated by multiplying a discrete fourier transform (DFT) matrix by each of a plurality of phase shift matrices; and multiple antennas transmitting the precoded data to the receiver, wherein each of the plurality of phase shift matrices is a diagonal matrix, and when N is the number of the plurality of phase shift matrices and i is an integer greater than or equal to 0 and less than N, (k,k) element of the ith phase shift matrix of the plurality of phase shift matrices is $$e^{j(k-1)\phi_i}, \phi_i = \frac{\pi * i}{2N}.$$

9. The apparatus of claim 8, wherein the codebook is obtained by giving an index to each of precoding matrices for each rank, the precoding matrices being generated by selecting column vectors equivalent to the number of ranks from column vectors included in the plurality of first matrices and combining the selected vectors.

10. The apparatus of claim 8, wherein the multiple antennas are dual polarized antennas.

11. The apparatus of claim 10, wherein the codebook is generated based on a plurality of second matrices generated by multiplying the plurality of first matrices by a fixed antenna weight.

12. The method of claim 11, wherein the fixed antenna weight is an M*M diagonal matrix, (M,M) element is −1, and elements on a diagonal line other than the (M,M) element are all 1.

13. A method of feedback information transmission from a receiver of a wireless communication system which uses multiple antennas, the method comprising:

estimating a channel between a transmitter and the receiver using a pilot signal received from the transmitter;

selecting an optimized precoding matrix from a codebook generated using each of plurality of matrices generated by multiplying a discrete fourier transform (DFT) matrix by each of a plurality of phase shift matrices by considering the estimated channel; and feeding identification information of the selected precoding matrix back to the transmitter, wherein each of the plurality of phase shift matrices is a diagonal matrix, and when N is the number of the plurality of phase shift matrices and i is an integer greater than or equal to 0 and less than N, (k,k) element of the ith phase shift matrix of the plurality of phase shift matrices is $$e^{j(k-1)\phi_i}, \phi_i = \frac{\pi * i}{2N}.$$

* * * * *